United States Patent [19] [11] Patent Number: 5,141,640
Sasajima et al. [45] Date of Patent: Aug. 25, 1992

[54] TUBULAR MEMBRANE MODULE FOR SEPARATION

[75] Inventors: Kunihiko Sasajima, Hashimoto; Hideo Mizobata, Osaka, both of Japan

[73] Assignee: Daicel Chemical Industries, Ltd., Osaka, Japan

[21] Appl. No.: 658,035

[22] Filed: Feb. 20, 1991

[51] Int. Cl.[5] .............................................. B01D 63/00
[52] U.S. Cl. ........................... 210/321.79; 210/321.8; 210/321.81; 210/321.88; 210/321.89; 210/336; 210/433.1; 210/490
[58] Field of Search ...................... 210/500.23, 321.87, 210/321.88, 321.89, 321.79, 321.72, 321.65, 321.87, 650, 321.81, 321.8, 490, 652, 336, 433.1

[56] References Cited

U.S. PATENT DOCUMENTS

| | | | |
|---|---|---|---|
| 3,581,900 | 6/1971 | Clark | 210/321.87 |
| 3,666,109 | 5/1972 | Goeldher | 210/321.87 |
| 3,708,069 | 1/1973 | Clark | 210/321.87 |
| 3,710,946 | 1/1973 | Sawyer | 210/321.87 |
| 4,016,078 | 4/1977 | Clark | 210/321.9 |
| 4,704,205 | 11/1987 | Ishii | 210/321.79 |
| 4,897,191 | 1/1990 | Langerak et al. | 210/321.81 |

Primary Examiner—Robert A. Dawson
Assistant Examiner—Ana Fortuna
Attorney, Agent, or Firm—Cohen, Pontani, Lieberman & Pavane

[57] ABSTRACT

A tubular membrane module for separation providing a plurality of perforated support tubes having a semipermeable membrane for separation provided on inner surfaces thereof, a cylindrical case having a permeated solution port provided on a drum portion thereof, a pair of first and second plastic headers attached to both ends perforated support tubes for making the perforated support tubes be communicated and header connecting means, the first header being divided into a first header outer portion having a feed solution inlet port and a concentrated solution outlet port provided on an outer surface thereof and a plurality of first communication ports which are groove-shaped provided on an inner surface thereof, and a first header inner portion held between the first header outer portion and the case and having first openings for fitting the perforated support tubes which correspond to the first communication ports, and the second header being divided into a second header outer portion having a plurality of second communication ports which are groove-shaped provided on an inner surface thereof and a second header inner portion held between the second header outer portion and the case and having second openings for fitting the perforated support tubes which correspond to the second communication ports.

8 Claims, 10 Drawing Sheets

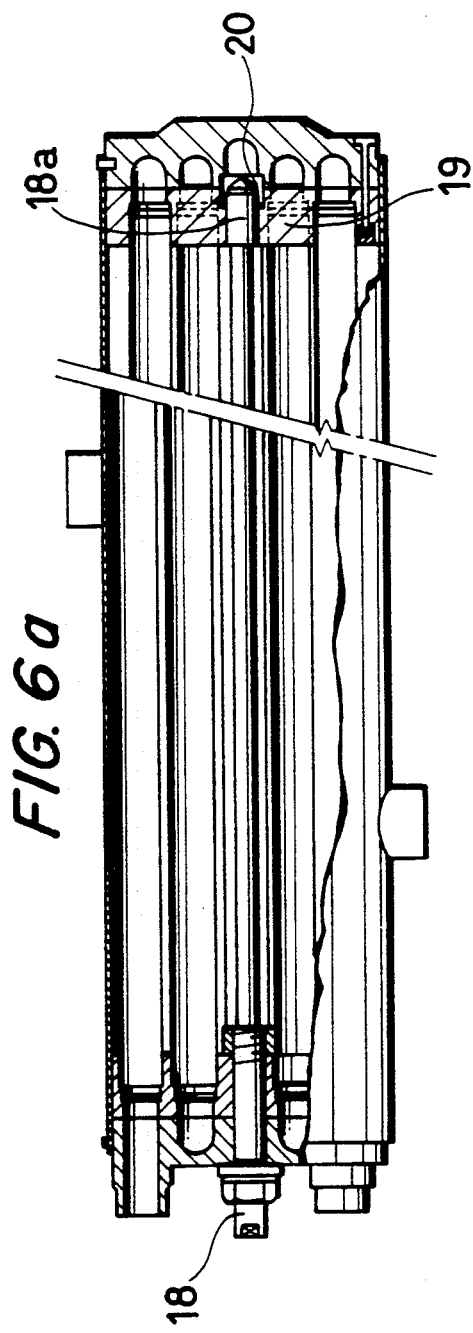
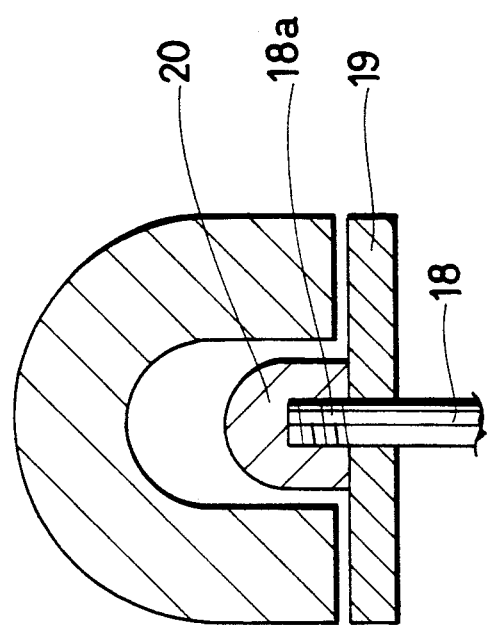
FIG.6a
FIG.6b

TUBULAR MEMBRANE MODULE FOR SEPARATION

BACKGROUND OF THE INVENTION

1. Field of the Invention

The present invention relates to a tubular membrane module (hereinafter sometimes referred to as a module) for separation having an ultrafiltration membrane and a low pressure reverse osmosis membrane, and more particularly to a membrane module head which is formed of plastics so as to be light and has high productivity.

2. Desciption of the Prior Art

Typically, a tubular module is disclosed in U.S. Pat. No. 4,704,205 assigned to Daicel Chemical Industries, Ltd. In general, a module is widely used for concentration, separation or purification of a liquid. Since a membrane is provided on an inner surface of a support tube, the tubular membrane can be pressure-resistant, In addition, the module is tube-shaped so that a structure thereof can be simplified.

However, since a pressure is applied on a head in a direction of a central axis of the tubular membrane, a head is made thicker in consideration of pressure-resistance. Consequently, a variety of problems are caused. Therefore, it is desired that the head has the simplified structure. Conventionally, the entire head is made of metal or a metallic U bend is embedded in a plastic head. In the former case, since a U passage is provided in the head, the head is increased in cost and made too heavy. Consequently, it is difficult to provide or convey the module. In the latter case, although the head is made slightly lighter as compared with the former case, it is difficult to center a lot of U bends.

SUMMARY OF THE INVENTION

To provide a plastic head which is light and has high productivity, pressure-resistance of the head and the simple flow of a solution in a module are the most important subjects. The present inventors have examined the above-mentioned subjects earnestly.

The present invention provides a tubular membrane module for separation comprising a plurality of perforated support tubes having a semipermeable membrane for separation provided on inner surfaces thereof, a cylindrical case having a permeated solution port provided on a drum portion thereof, a pair of first and second plastic headers attached to both ends of the case and the perforated support tubes for making the perforated support tubes be communicated with one another horizontally, in parallel and zigzags so as to form a serial support tube group in the case, injecting a feed solution from one end of the perforated support tube to finally discharge a concentrated solution and a permeated solution from the end of the perforated support tube and the permeated solution port of the case respectively, and header connecting means, the first header being divided into a first header outer portion having a feed solution inlet port and concentrated solution outlet port provided on an outer surface thereof and a plurality of first communication ports which are groove-shaped provided on an inner surface thereof, and a first header inner portion held between the first header outer portion and the case and having first openings for fitting the perforated support tubes which correpond to the first communication ports, the second header being divided into a second header outer portion having a plurality of second communication ports which are groove-shaped provided on an inner surface thereof and a second header inner portion held between the second header outer portion and the case and having second openings for fitting the perforated support tubes which correspond to the second communication ports, and the header conecting means including a tie rod which penetrates the first header and an approximately central portion of a gap defined in the serial support tube group, a rod-shaped header fixture which penetrates a second communication port of the second header and has an interior screw, with which the tie rod is jointed in order to connect the first and second headers in tension provided on a tip portion thereof and a lateral hole which penetrates the drum portion to prevent the second communication ports from being divided, and auxiliary connecting means for respectively integrating the first header outer and inner portions and the second header outer and inner portions on the outer periphery.

According to the present invention, the tubular membrane module for separation comprises a pair of plastic headers which are to be attached to both ends of a case and perforated support tubes respectively and are formed each as one body of two divided members. The pair of headers are connected by a tie rod, a header fixture and auxiliary connecting means. The tie rod penetrates a gap between a support tube group through a first header. The header fixture is inserted through a second header and is connected to the tie rod in order to connect the headers in tension, so that pressure-resistance of the headers can be improved. The auxiliary connecting means connect the divided members of the headers on the outer periphery. In addition, there is provided a lateral hole which penetrates a drum portion of the header fixture. Consequently, solution residence portions can be prevented from being generated in the perforated support tubes.

According to the present invention, in the case where the both headers are to be formed of a plastic, it is preferred that the divided members are respectively formed of a plastic reinforced with an inorganic material such as glass fiber or carbon fiber in consideration of the strength and moldability of a material.

More specifically, although the headers molded of a glass fiber reinforced plastic are thicker, groove-shaped communication ports and openings for fitting the perforated support tubes, which are formed on the headers, have the increased precision in dimension thereof as compared with the case where the headers are molded of only the plastic.

According to the present invention, examples of a plastic material which are used in glass fiber reinforced plastic headers are polysulfone resins, polyamide resins, modified PPO (polyphenylene oxide) resins, polycarbonate resins, polyether imide resins, polyphenylene sulfide resins and the like. In particular, the modified PPO resins which are not so expensive and excellent in moldability can be widely used. Preferably, the content of the glass fiber is 5 to 40 (w/w)%, and more preferably, 30 (w/w)%.

In FIG. 1, a first header 1 of the present invention has an O ring 7 and a collar 8 attached to a tie rod 6. The tie rod 6 is inserted into an approximately central portion 5 of a gap defined in a support tube group 4 through a first insertion hole 2 of a first header outer portion 1a and a second insertion hole 3 of a first header inner portion 1b. At the time of assembling, the first header 1 is tightened by the collar 8 and a nut 9 of the tie rod 6.

In FIG. 2 a second header 10 of the present invention includes a header fixture 11 which has a lateral hole 12 provided through a drum portion 11a and an interior screw 11b provided on a tip portion thereof. The header fixture 11 can be connected to the tie rod 6 with the interior screw 11b. In addition, the header fixture 11 has a tip portion 11c thereof engaged with an engagement portion 13a so as to be connected to the tie rod 6 through a central portion 13b of a plurality of second communication ports 13 and a third insertion hole 14 of a second header inner portion 10b. The second header outer portion 10a has the second communication ports 13 formed on an inner surface thereof. The engagement portion 13b is formed in the middle of the third insertion hole 14. The header outer and inner portions 10a and 10b are tightened by a washer 6a provided on a shaft portion 3b of the tie rod 6, and a nut 15 fixed to a screw portion 11d of the fixture 11.

The divided members of the header are ultrasonic-welded together or adhered to each other by means of gaskets 40 and 41 shown in FIGS. 3(e) and 4(e). Consequently, the headers are tightened by the tie rod and the like so that they can surely be prevented from being deformed when pressurized.

According to the present invention, a solution flows in the module without fluctuations as shown in FIG. 5(b). Consequently, residence is not caused in the module.

More specifically, the first and second header outer portions 1a and 10a have a plurality of first and second communcation ports 24 and 13 provided thereon respectively in such a manner that a serial support tube group 4 is communicated in zigzags. In addition, the fixture 11 which is inserted into the second header outer portion 10a has the lateral hole 12 provided thereon as shown in FIG. 2. Consequently, if the module is tightened by a single longer bolt, the solution can be prevented from staying in the module as shown in FIG. 7. In other words, a residence portion 17 can be prevented from being generated in a perforated support tube 34a as shown by oblique lines.

With a structure in which a tip portion 18a of a longer bolt 18 is connected to a cap nut 20 so as to tighten an inner header portion 19 as shown in FIGS. 6(a) and (b) a pressure is received by only the inner header portion 19 even if the solution may flow in a similar manner to FIG. 5(b). Consequently, pressure-resistance is lowered. According to the present invention, connecting means is provided in such a manner that both the second header outer and inner portions 10a and 10b receive a pressure applied on the second header 10. Consequently, the pressure-resistance is improved.

BRIEF DESCRIPTION OF THE DRAWINGS

FIG. 6 (a and b) are views showing a structure of a conventional example; and

DETAILED DESCRIPTION OF A PREFERRED EMBODIMENT

Figure 1:
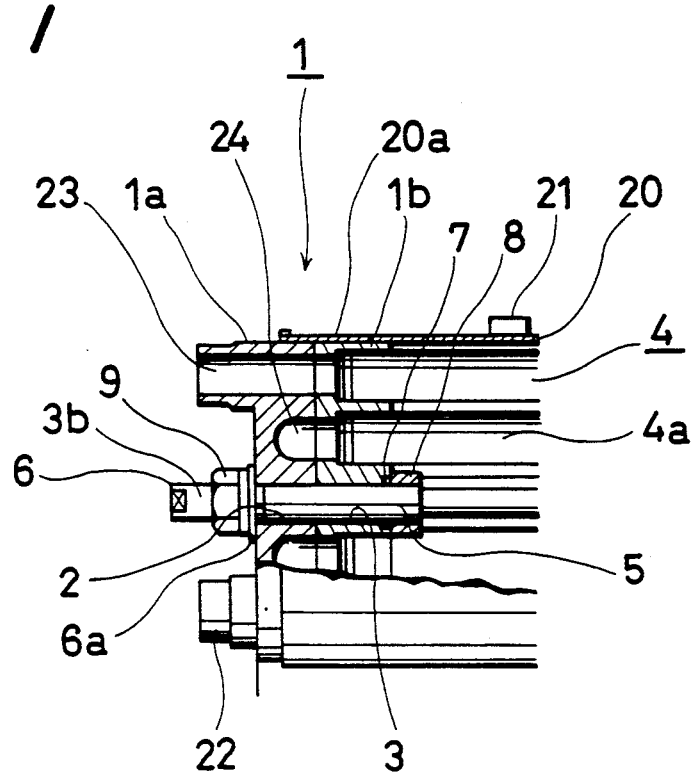
FIG. 1 is a view showing a structure of a first header portion according to one embodiment of the present invention.
Figure 2:
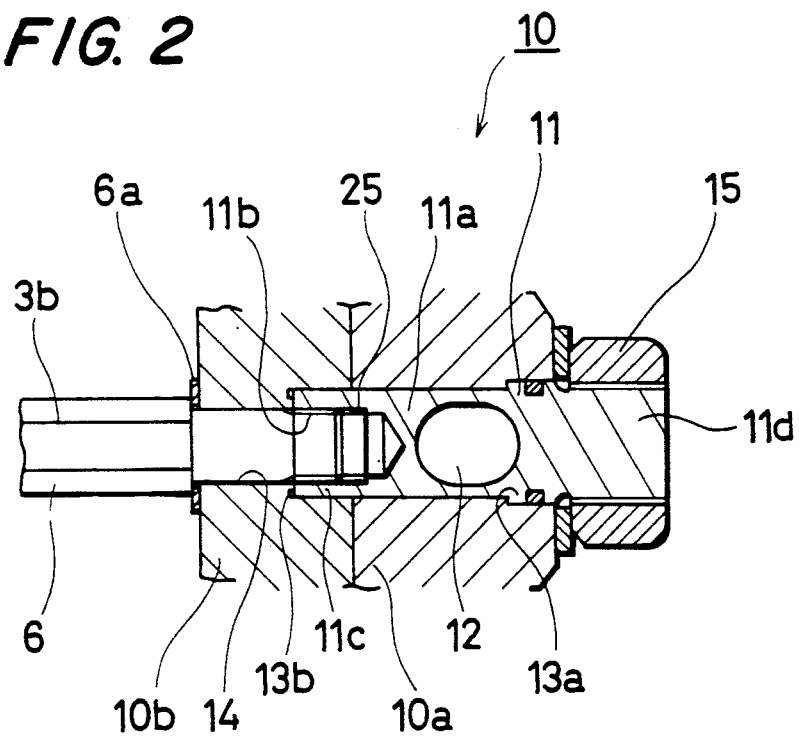
FIG. 2 is a view showing a structure of a second header portion according to the above-mentioned embodiment.

There will be described an embodiment of the present invention with reference to the drawings. The present invention is not limited to the embodiment to be described below.

In FIGS. 1 to 7, a tubular membrane module (hereinafter referred to as a module) for ultrafiltration mainly comprises 18 perforated support tubes 4a, a cylindrical case 20, a pair of first and second headers 1 and 10 formed of a plastic resin containing glass fiber, and header connecting means. The perforated support tube 4a has a ultrafiltration membrane provided on an inner surface thereof. The cylindrical case 20 has a permeated solution port 21 provided on a drum portion 20a thereof. The first and second headers 1 and 10 are respectively attached to both ends of the case 20 and the perforated support tubes 4a so that the perforated support tubes 4a are horizontally communicated with one another in parallel and in zigzags in order to form a serial support tube group 4 in the case 20. In addition, a feed solution is injected from one end of the perforated support tube 4a so that a concentrated solution and a permeated solution are finally discharged from the end of the perforated support tube 4a and the permeated solution port 21 of the case 20, respectively.

Furthermore, the first header 1 is divided into a first header outer portion 1a and first header inner portion 1b which are joined at junctions 50a and 50b. The first header outer portion 1a has a feed solution inlet port 22 and a concentrated solution outlet port 23 provided on an outer surface thereof and 8 first communication ports 24 which are groove-shaped (see FIG. 3 (d) provided on an inner surface thereof. The first header inner portion 1b is held between the first header outer portion 1a and the case 20 and has 18 first openings 25 for fitting the perforated support tubes (see FIG. 3 (c)) which correspond to the first communication ports 24.

The second header 10 is divided into a second header outer portion 10a and a second header inner portion 10b which are joined at junctions 51a and 51b. The second header outer portion 10a has 9 second communication ports 13 which are groove-shaped (see FIG. 4 (d)) provided on an inner surface thereof. The second header inner portion 10b is held between the second header outer portion 10a and the case 20 and has 18 second openings 26 for fitting the perforated support tubes which correspond to the second communication ports 13.

Figure 3B:
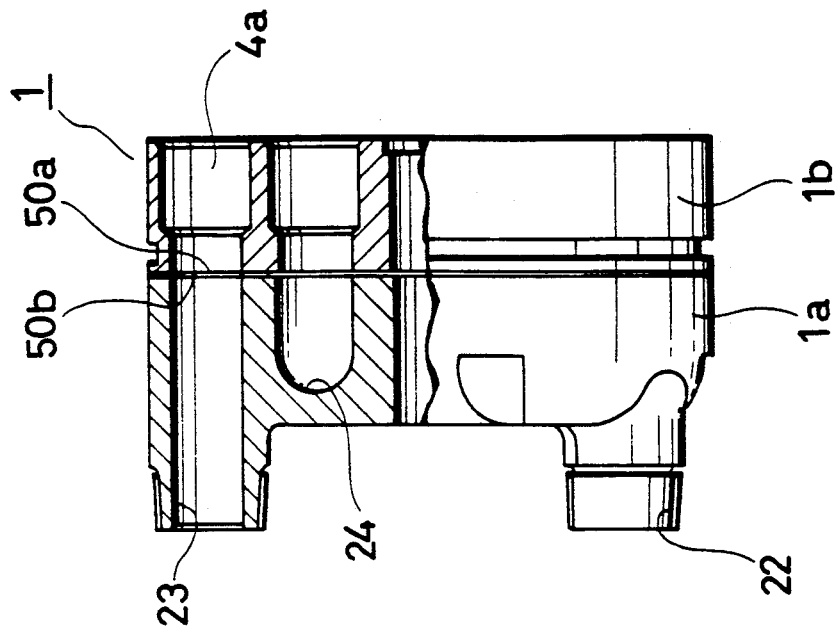
FIGS. 3 (a-e) and 4(a-e) are exploded perspective views of main portions of the first and second headers according to the above-mentioned embodiments, respectively.
Figure 3A:
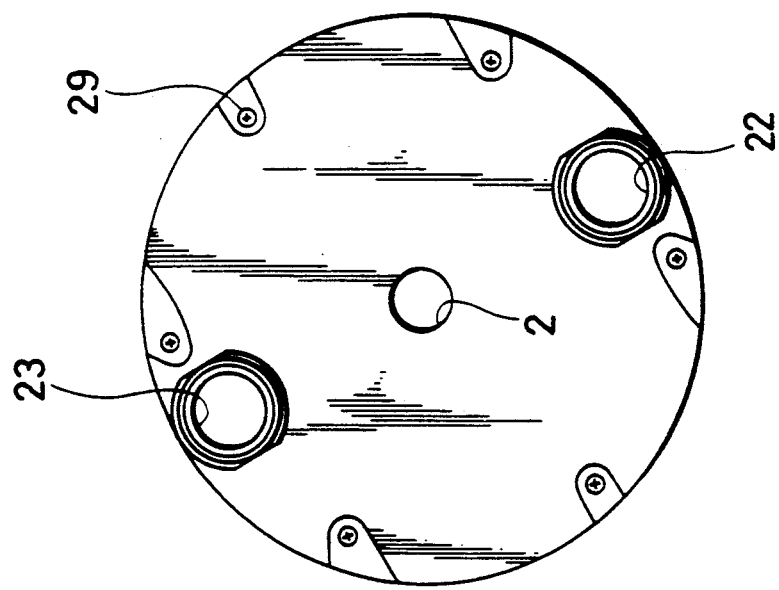
Figure 3C:
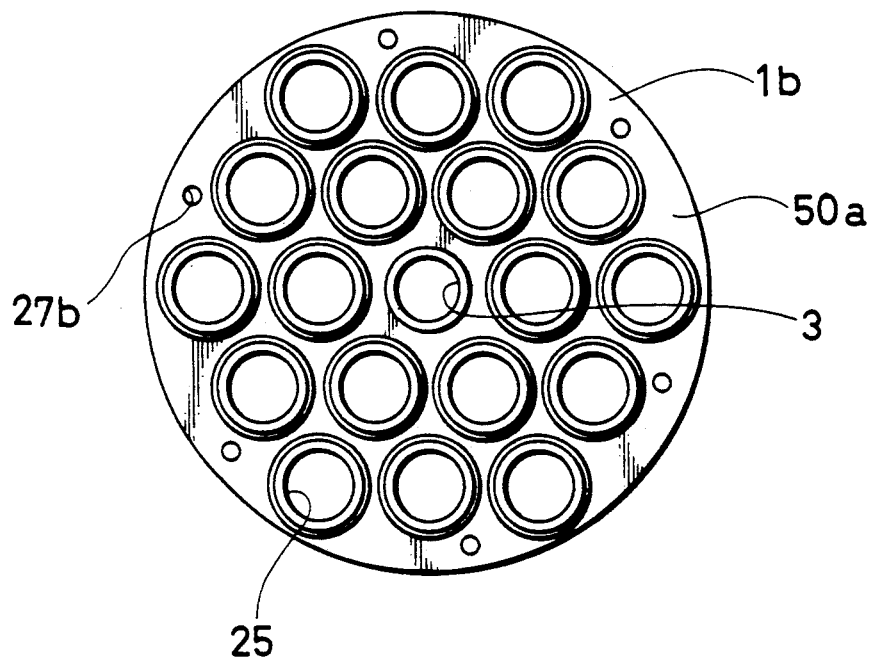
Figure 3D:
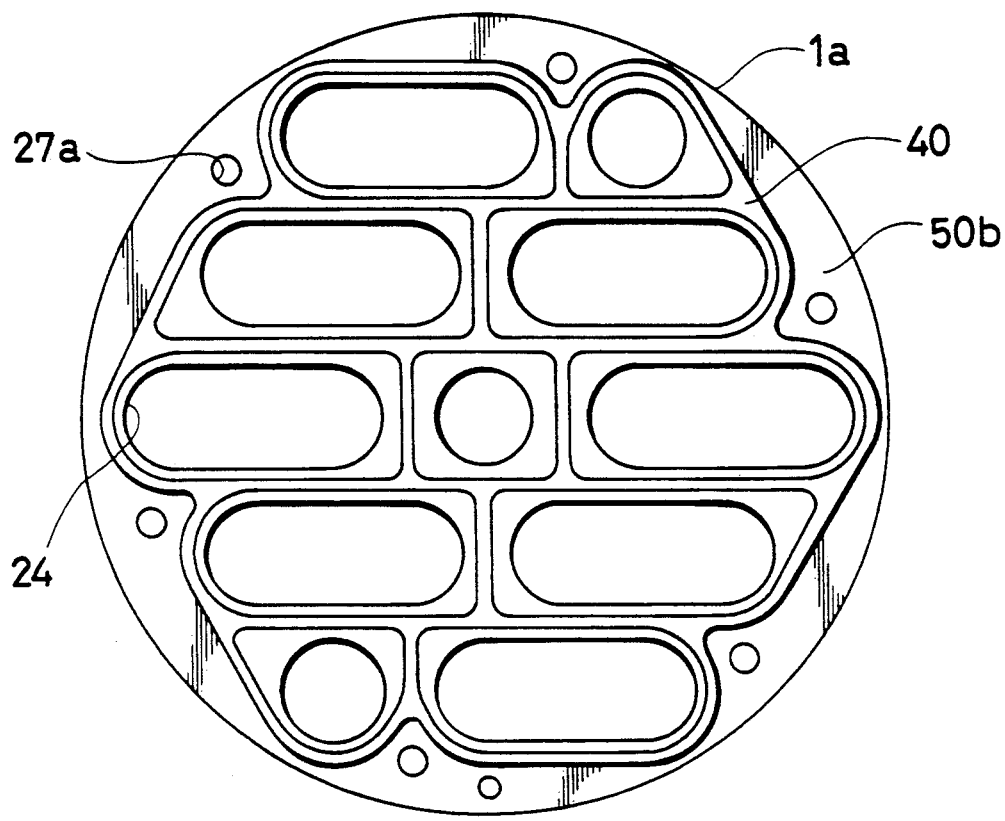
Figure 3E:
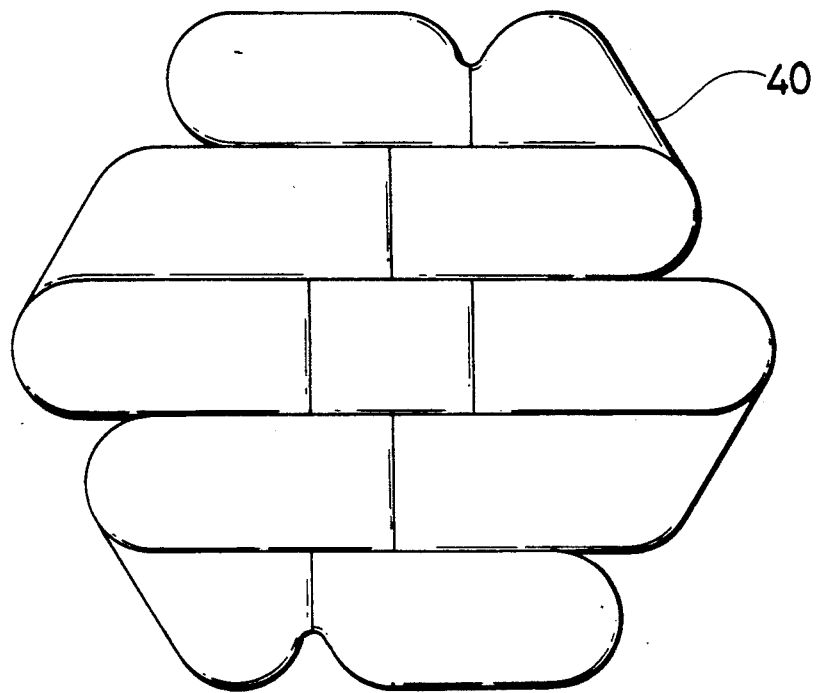
Figure 4B:
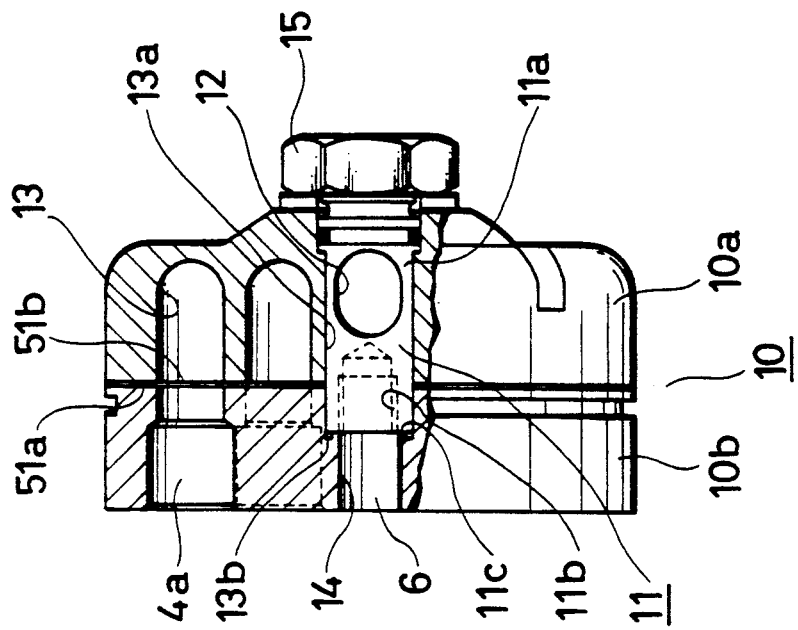
Figure 4A:
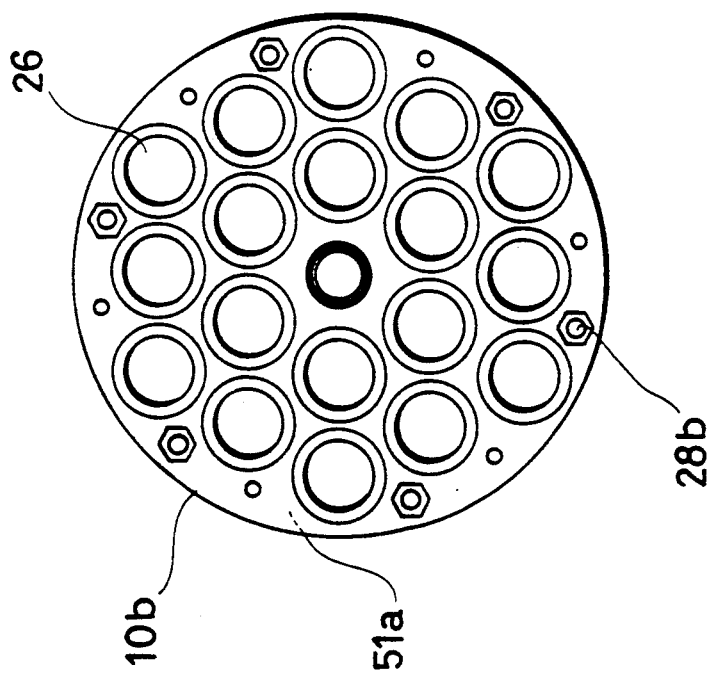
Figure 4C:
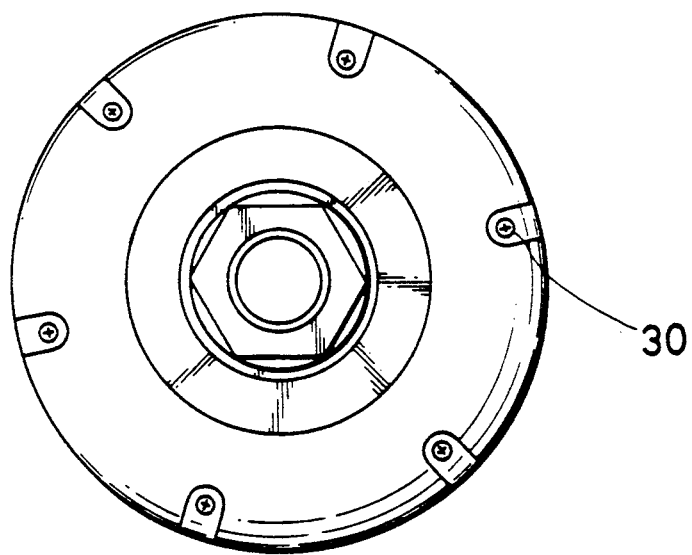
Figure 4D:
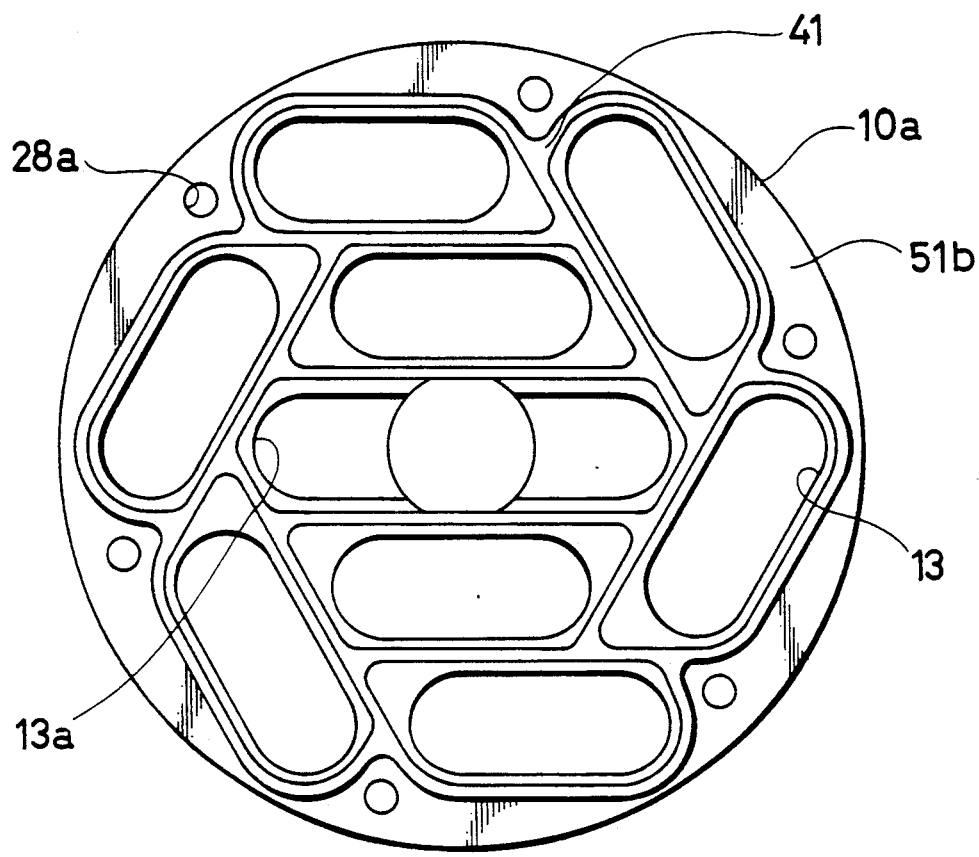
Figure 4E:
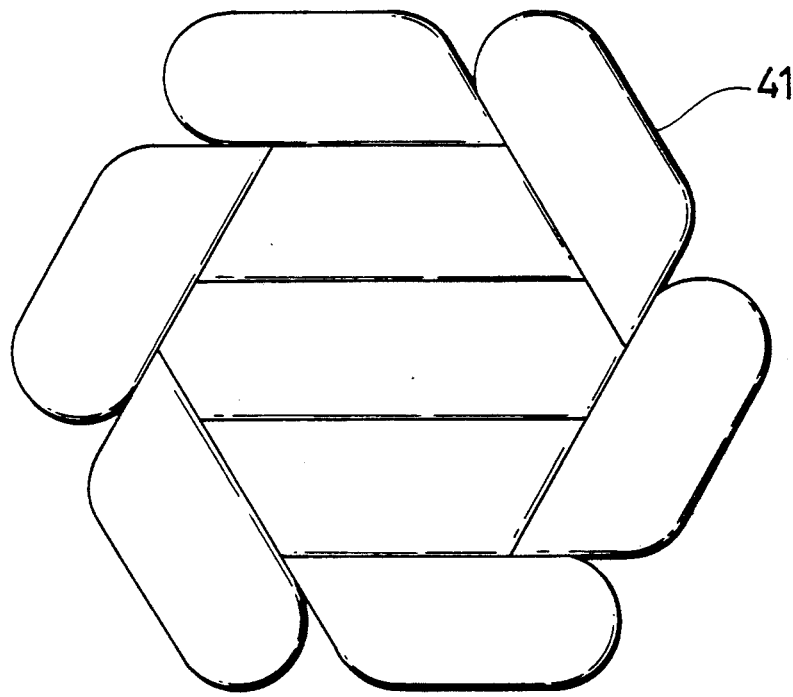
Figure 5A:
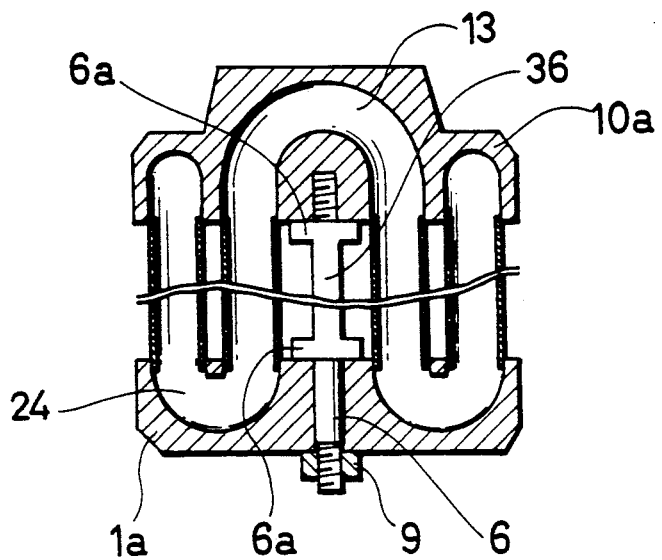
FIG. 5 (a and b) are views showing a structure of a main portion for explaining the flow of a solution according to the above-mentioned embodiment.
Figure 5B:
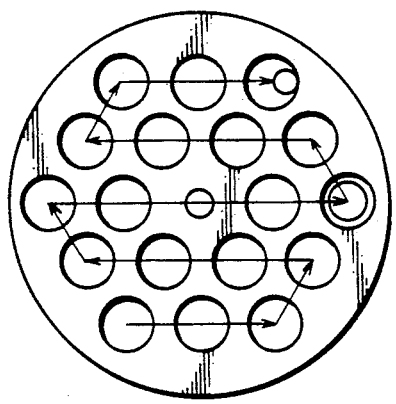
Figure 7:
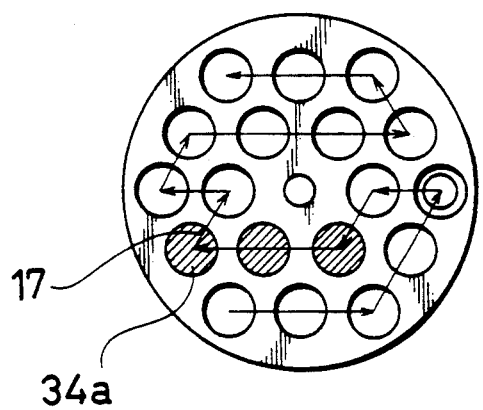
FIG. 7 is a view showing a structure of a main portion for explaining the flow of a solution according to the conventional example.

The header connecting means includes a tie rod 6, a rod-shaped header (fixture 11, screw holes 27a, 27b, 28a and 28b, and connecting screws 29 and 30 (see FIGS. 3(a), (c) and (d), and FIGS. 4 (a), (c) and (d)). The tie rod 6 penetrates the first header 1 at an approximately central portion 5 of a gap defined in the serial support tube group 4. The header fixture 11 has an interior screw 11b provided on a tip portion thereof and a lateral hole 12. In addition, the header fixture 11 penetrates the second communication ports 13a (see FIGS. 2 and 4 (d)) and is connected to the tie rod 6 with the interior screw 11b in order to connect the first and second headers 1 and 10 in tension. The lateral hole 12 penetrates a drum portion 11a to prevent the second communication ports 13a from being divided. The screw holes 27a, 27b, 28a and 28b and the connecting screws 29 and 30 serve as auxiliary connecting means to unite the first header outer and inner portions 1a and 1b, and the second header outer and inner portions 10a and 10b on the outer periphery, respectively.

EMBODIMENT 1

A header is molded of Noryl resin (GFN3J; manufactured by EPL). Header portions are ultrasonically welded together or adhered to each other by means of gaskets 40 and 41. The header is modularized and pressurized at an amount of supplied water, i.e., 1.8m³/Hr. Shown in Table 1 is a pressure (of a module inlet) applied when a leakage is caused at junctions of the header portions.

TABLE 1

| | Pressure-resistant strength of a header (kg/cm²) | | |
|---|---|---|---|
| Temperature | Junction | First header | Second header |
| 25° C. | Gasket | 90 or more | 80 |
| | Ultrasonic wave | 90 or more | 80 |
| | Adhesive (1) | 38 or more | 30 |
| | Adhesive (2) | 37 or more | 31 |
| 80° C. | Gasket | 90 or more | 80 |
| | Ultrasonic wave | 90 or more | 78 |
| | Adhesive (1) | 15 or more | 10 |
| | Adhesive (2) | 17 or more | 9 |

Where an adhesive (1) is an epoxy adhesive (Araldyte AV 138; manufactured by Chiba Guigy)
and an adhesive (2) is an epoxy adhesive (Cemedine 1565; manufactured by Cemedine Kogyo Kabushiki Kaisha)

COMPARATIVE EXAMPLE 1

Similar to embodiment 1, the case where an epoxy adhesive is used for an adhesive is shown in Table 1. In Table 1, a leakage is caused at the junctions.

COMPARATIVE EXAMPLE 2

A cap nut 20 shown in FIGS. 6 (a) and (b) is used for a header fixture. A header is formed of a resin to be described below in order to perform a pressure-resistant test. Gaskets are used for junctions. The result of the test is shown in Table 2.

Where a resin (1) is Noryl: GFN3J (manufactured by EPL)
and a resin (2) is Polysulfone (which contains glass fiber at 30 (w/w)%) (manufactured by Nissan Kagaku Kogyo).

TABLE 2

| Pressure-resistant strength of a header (kg/cm²) | |
|---|---|
| Junction | Second header |
| Noryl | 39 |
| Polysulfone | 37 |

In Table 2, a leakage is caused by damage to an inner header portion 19 of the second header.

According to the present invention, a tubular membrane module for separation comprises a pair of plastic headers which are to be attached to both ends of a case and perforated support tubes respectively. Each header is to be integrated by two divided members. The pair of headers are connected by a tie rod, a header fixture and auxiliary connecting means. The tie rod penetrates a support tube group through a first header. The header fixture is inserted through a second header and connected to the tie rod in order to connect the headers in tension. The auxiliary connecting means unite the divided members of the headers on the outer periphery. In addition, there is provided a lateral hole which penetrates a drum portion of the header fixture. Consequently, solution residence portions can be prevented from being generated in the perforated support tubes. Furthermore, pressure-resistance of the headers can be improved.

What is claimed is:
1. A tubular membrane module for the concentration, separation and purification of a liquid, comprising:
   a cylindrical outer case having first and second ends;
   a plurality of perforated support tubes disposed within said outer case and having inner surfaces thereon;
   semipermeable membranes disposed on said inner surfaces of said support tubes;
   first and second headers respectively attached to said first and second ends of said case and also attached to said support tubes so as to render said support tubes in fluid communication with one another in a horizontal, parallel and zigzag manner thereby collectively forming a serial support tube group disposed in said case, each of said first and second headers comprising:
      a header outer portion having an inner surface, an outer surface and a plurality of header communication ports provided on said inner surface, said header communication ports having groove-shaped conformations; and
      a two-sided header inner portion positioned between said header outer portion and said respective end of said case and having header channels therethrough such that said header channels engage with said support tubes on a first side of the header inner portion and engage with said header communication ports on the second side of said header inner portion to enable fluid to be communicated through said header via said header channels and said header communication ports;
   header connecting means, comprising:
      a tie rod penetrating said first header at approximately a central location in its outer portion and travelling substantially lengthwise through the module;
      a rod-shaped second header fixture positioned substantially within said second header, comprising an engagement portion for engagement with said tie rod, and an aperture-containing portion annexed to said engagement portion and positioned such that the aperture prevents said second header communication ports from being divided;
      auxiliary connecting means for connecting, respectively, said first header outer and inner portions and second header outer and inner portions; and
   feed solution inlet and outlet ports positioned on said first header outer portion's outer surface, said ports placed in fluid communication with said serial support tube group such that by injecting a feed solution through said feed solution inlet port into said support tubes, said feed solution is passed through said perforated support tubes, said semipermeable membranes and said aperture with substantially no residence portions, said solution is concentrated and permeated, and a concentrated and permeated solution is finally discharged through said outlet port.

2. A tubular membrane module for the concentration, separation and purification of a liquid, comprising:
- a cylindrical outer case having first and second ends;
- a plurality of perforated support tubes disposed within said outer case and having inner surfaces thereon;
- semipermeable membranes disposed on said inner surfaces of said support tubes;
- first and second headers respectively attached to said first and second ends of said case and also attached to said support tubes so as to render said support tubes in fluid communication with one another in a horizontal, parallel and zigzag manner thereby collectively forming a serial support the group disposed in said case, each of said first and second headers comprising:
  - a header outer portion having an inner surface, an outer surface and a plurality of header communication ports provided on said inner surface, said header communication ports having groove-shaped conformations; and
  - a two-sided header inner portion positioned between said header outer portion and said respective end of said case and having header channels therethrough such that said header channels engage with said support tubes on a first side of the header inner portion and engage with said header communication ports on the second side of said header inner portion to enable fluid to be communicated through said header via said header channels and said header communication ports;
- header connecting means, comprising:
  - a tie rod penetrating said first header at approximately a radially central location in its outer portion and travelling substantially lengthwise throught the module;
  - a rod-shaped second header fixture positioned substantially within said second header, comprising an engagement portion for engagement with said tie rod, and an aperture-containing portion annexed to said engagement portion and positioned such that the aperture prevents said second header communication ports from being divided;
  - auxiliary connecting means for connecting, respectively, said first header outer and inner portions and second header outer and inner portions;
- feed solution inlet and outlet ports positioned on said first header outer portion's outer surface, said ports placed in fluid communication with said serial support tube group such that by injecting a feed solution through said feed solution inlet port into said support tubes, said feed solution is passed through said perforated support tubes, said semipermeable membranes and said aperture with substantially no residence portions, said solution is concentrated and permeated, and a concentrated and permeated solution is finally discharged through said outlet port; and
- wherein said first and second headers are molded of a plastic reinforced with an inorganic material.

3. A tubular membrane module for the concentration, separation and purification of a liquid, comprising:
- a cylindrical outer case having first and second ends;
- a plurality of perforated support tubes disposed within said outer case and having inner surfaces thereon;
- semipermeable membranes disposed on said inner surfaces of said support tubes;
- first and second headers respectively attached to said first and second ends of said case and also attached to said support tubes so as to render said support tubes in fluid communication with one another in a horizontal, parallel and zigzag manner thereby collectively forming a serial support tube group disposed in said case, each of said first and second headers comprising:
  - a header outer portion having an inner surface, an outer surface and a plurality of header communication ports provided on said inner surface, said header communication ports having groove-shaped conformations; and
  - a two-sided header inner portion positioned between said header outer portion and said respective end of said case and having header channels therethrough such that said header channels engage with said support tubes on a first side of the header inner portion and engage with said header communication ports on the second side of said header inner portion to enable fluid to be communicated through said header via said header channels and said header communication ports;
- header connecting means, comprising:
  - a tie rod penetrating said first header at approximately a radially central location in its outer portion and travelling substantially lengthwise through the module;
  - a rod-shaped second header fixture positioned substantially within said second header, comprising an engagement portion for engagement with said tie rod, and an aperture-containing portion annexed to said engagement portion and positioned such that the aperture prevents said second header communication ports from being divided;
  - auxiliary connecting means for connecting, respectively, said first header outer and inner portions and second header outer and inner portions;
- feed solution inlet and outlet ports positioned on said first header outer portion's outer surface, said ports placed in fluid communication with said serial support tube group such that by injecting a feed solution through said feed solution inlet port into said support tubes, said feed solution is passed through said perforated support tubes, said semipermeable membranes and said aperture with substantially no residue portions, said solution is concentrated and permeated, and a concentrated and permeated solution is finally discharged through said outlet port; and
- wherein said first and second headers are molded of a polymer selected from the group consisting of polysulfone, polyamide, polyphenylene oxide, polycarbonate, polyetherimide and polyphenylene sulfide.

4. The module of claim 2, wherein said inorganic material is selected from the group consisting of glass fiber and carbon fiber.

5. The module of claim 3, wherein said polymer further contains glass fiber at 5 to 40 (w/w)%.

6. A tubular membrane module for the concentration, separation and purification of a liquid, comprising:

a cylindrical outer case having first and second ends;

a plurality of perforated support tubes disposed within said outer case and having inner surfaces thereon;

semipermeable membranes disposed on said inner surfaces of said support tubes;

first and second headers respectively attached to said first and second ends of said case and also attached to said support tubes so a to render said support tubes in fluid communication with one another in a horizontal, parallel and zigzag manner thereby collectively forming a serial support tube group disposed in said case, each of said first and second headers comprising:

a header outer portion having an inner surface, an outer surface and a plurality of header communication ports provided on said inner surface, said header communication ports having groove-shaped conformations; and a two-sided header inner portion positioned between said header outer portion and said respective end of said case and having header channels therethrough such that said header channels engage with said support tubes on a first side of the header inner portion and engage with said header communication ports on the second side of of said header inner portion to enable fluid to be communicated through said header via said header channels and said header communication ports;

header connecting means, comprising:

a tie rod penetrating said first header at approximately a radially central location in its outer portion and through a first insertion hole in said outer portion, travelling thereafter through a second insertion hole in said inner portion and then in a substantially lengthwise direction through the module;

an O-ring and a collar on said first header attaching to said tie rod which can be tightened during assembly;

a rod-shaped second header fixture penetrating into a drum portion of said second header, comprising an interior screw-engagement portion for engagement with a tip portion of said tie rod, said engagement portion radially disposed in a third insertion hole positioned in said second header inner portion in order to be connected to said tie rod through said insertion hole, and an aperture-containing portion annexed to said engagement portion and positioned such that the aperture prevents said second header communication ports from being divided;

auxiliary connecting means for connecting, respectively, said first header outer and inner portions and second header outer and inner portions;

tightening means for tightening said header outer and inner portions comprising a washer positioned on a shaft portion of said tie rod and a nut which is fixed to a screw portion of said second header fixture; and feed solution inlet and outlet ports positioned on said first header outer portion's outer surface, said ports placed in fluid communication with said serial support tube group such that by injecting a feed solution through said feed solution inlet port into said support tubes, said feed solution is passed through said perforated support tubes, said semipermeable membranes and said aperture with substantially no residence portions, said solution is concentrated and permeated, and a concentrated and permeated solution is finally discharged through said outlet port.

7. A tubular membrane module for separation according to claim 6, wherein the first and second headers form two divided members. which are ultrasonically-welded together.

8. The tubular membrane module of claim 6, wherein the first and second headers form two divided members which are adhered to each other by gaskets.

* * * * *